PUNCHED-TAPE READING APPARATUS

Filed Aug. 23, 1957 2 Sheets-Sheet 1

INVENTORS
Robert S. John Jr.
William C. Cavallo
BY Dorns, McDougall, Williams & Hersh
Attorneys June 13, 1961 R. S. JOHN, JR., ET AL 2,988,271

PUNCHED-TAPE READING APPARATUS

Filed Aug. 23, 1957 2 Sheets-Sheet 2

INVENTORS
Robert S. John, Jr.
William C. Cavallo
BY Osms, McDougall, Williams & Hersh
Attorneys 2,988,271

PUNCHED-TAPE READING APPARATUS

Robert S. John, Jr., Deerfield, and William C. Cavallo, Chicago, Ill., assignors to Cook Electric Company, Chicago, Ill., a corporation of Delaware Filed Aug. 23, 1957, Ser. No. 679,811
4 Claims. (Cl. 235—61.11)

This invention relates to the art of "reading"—that is, extracting data from—punched tape. In particular, it relates to a tape reader possessing important advantages over prior-art devices with respect to compactness, structural simplicity, mechanical ruggedness, and immunity to moisture invasion.

Punched tape of the type with which the present invention is used is widely employed as a data carrier in computing apparatus and other types of modern automatic machinery. While such tapes may differ from one another in details, according to the applications for which they are respectively designed, they all are characterized by having a large number of small punched holes disposed longitudinally along the tape and, as a rule, arranged across the width of the tape in a plurality of parallel rows.

Typical of such tapes is a tape employed in connection with an electronic computer, wherein the apertures are arranged on the tape in, for example, eight parallel rows. One of such rows, often called the "sprocket," will have punched apertures spaced at regular intervals along the length of the tape, perhaps one-tenth of an inch apart. The other rows of apertures will run parallel to the sprocket row, being spaced across the width of the tape at predetermined intervals. Longitudinally, however, these other rows of apertures will not, in general, contain an aperture at each position corresponding to an aperture in the sprocket row. In other words, at any given longitudinal position on the tape, some of the rows will contain apertures while others will not. It is in this manner that coded information is recorded on the tape.

In some cases, no sprocket row is used, in which event all of the rows of apertures on the tape will have blank positions where no aperture is present.

The present invention is directed to a "reading" apparatus by means of which the coded information on such a punched tape can be rapidly and accurately translated into electrical impulses for such further application as may be desired.

An important object of the present invention is to provide a photoelectric tape-reading apparatus in which the assembly of light-sensitive elements is unusually compact. Another object of the invention is to provide a tape reader wherein information may be taken off the tape by photoelectric means without the necessity for using elaborate optical apparatus, such as prisms, rods, or lenses, between the tape and the photoelectric cells. Still another object of the invention is to provide a photoelectric tape reader wherein all the sensitive parts can be readily sealed against moisture access, insuring dependable service and great reliability despite wide variations in the ambient temperature and humidity conditions. Still other objects and advantages of the invention will appear from the following detailed description of a typical embodiment of the invention.

Figures 1, 2:
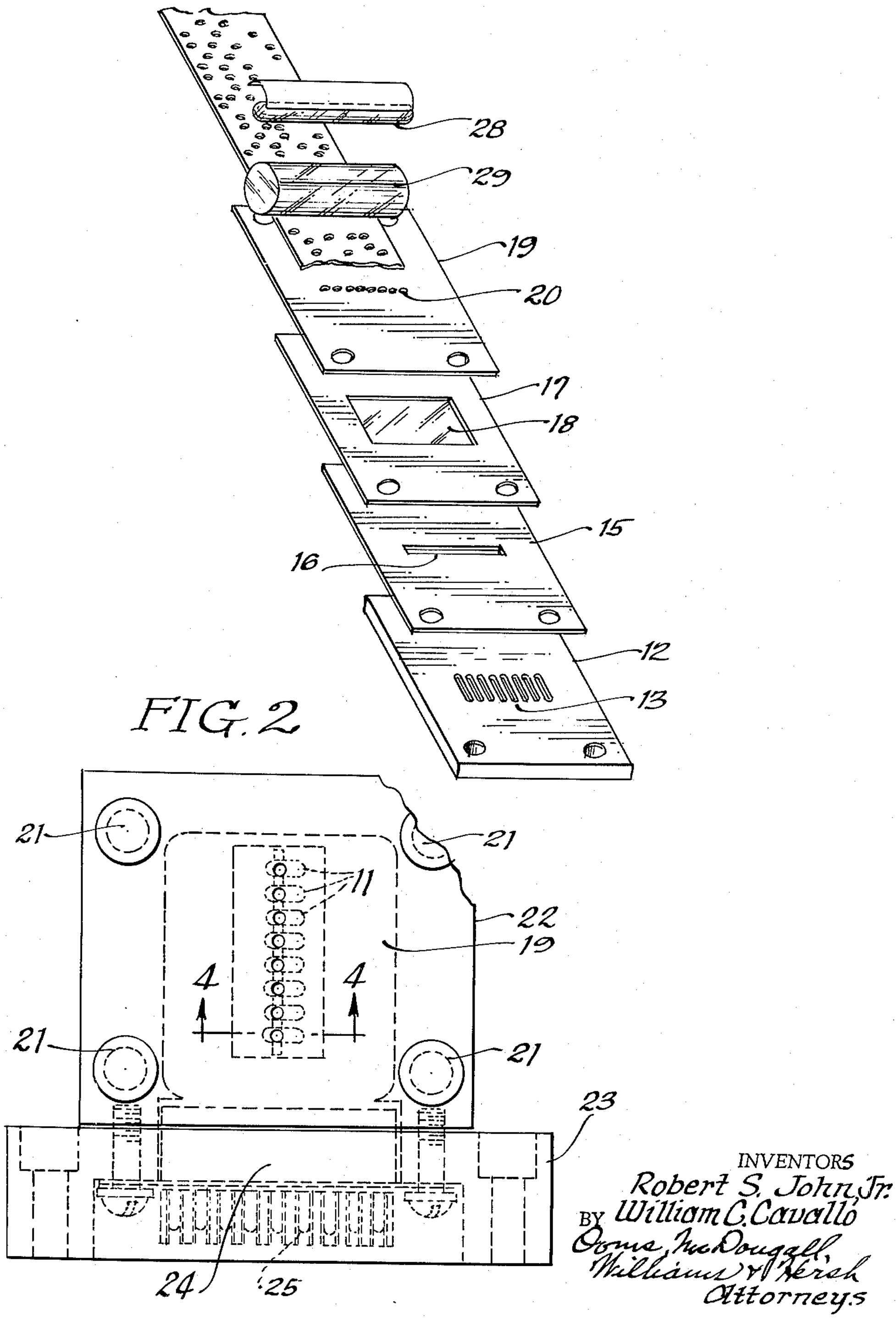
Figure 3:
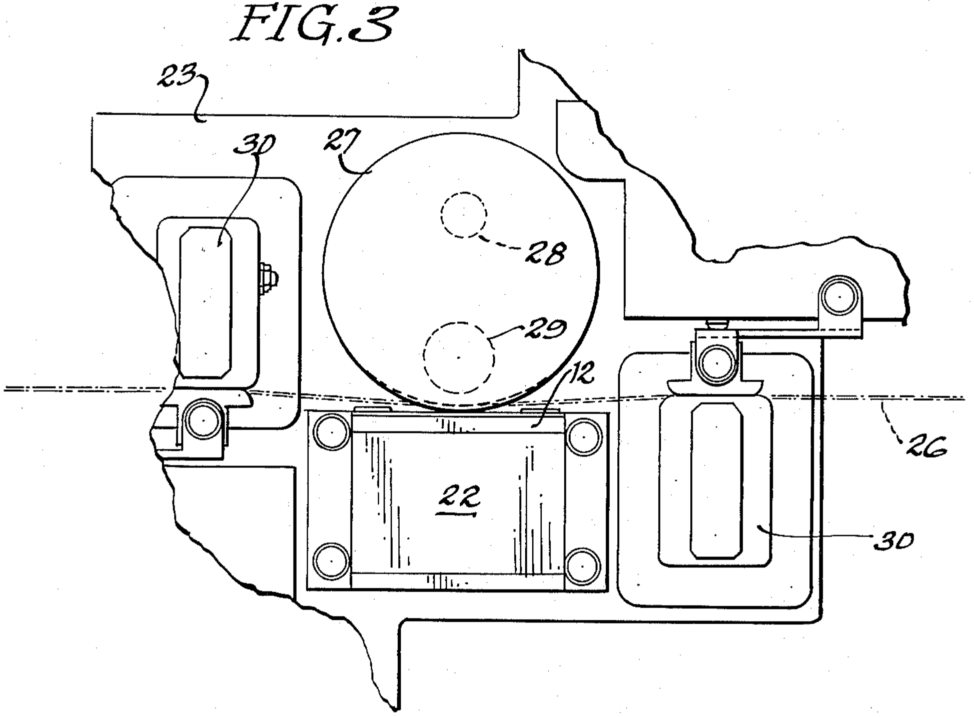
Figure 4:
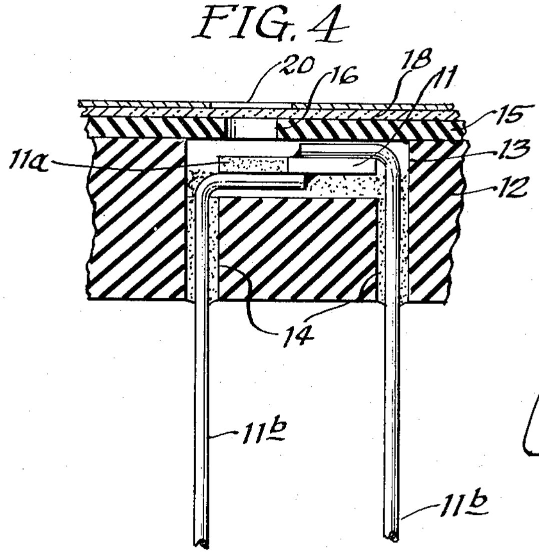
Figure 5:
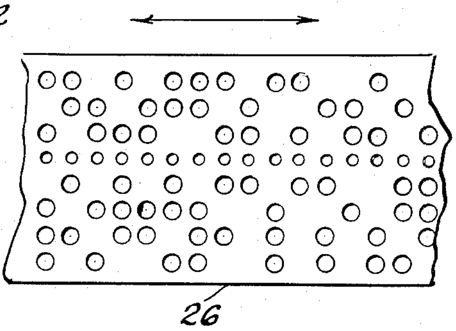

In the appended drawing, FIG. 1 is an exploded view showing the various structural layers or laminations in the reading head which forms an important part of our invention. FIG. 2 is a plan view showing our reading head assembled on a suitable support block. FIG. 3 is a fragmentary side elevation view of a completed tape reader embodying our invention. FIG. 4 is a fragmentary sectional view along the line 4—4 of FIG. 2, bringing out in detail the manner in which the photoelectric cells are mounted in our reading head. FIG. 5 is a plan view showing a typical tape of the type with which our invention is used.

The illustrated embodiment of our invention is a tape-reading apparatus designed for use with a tape having eight rows or columns of apertures disposed longitudinally of the tape, such columns being spaced uniformly across the width of the tape. It will of course be understood that this is illustrative. The detailed design of the reader will of course be in all cases adjusted to suit the characteristics of the punched tape with which it is to be used.

In our tape reader, we employ miniature photoelectric cells of the type indicated by the reference numeral 11 in FIGS. 2 and 4. These cells measure only about one-eighth inch in length by about one-sixteenth inch in width, and have a photosensitive area, indicated in FIG. 4 by the reference numeral 11*a*, which is about one-sixteenth inch in length and breadth. Such cells are at present commercially obtainable from Hoffman Electronics Corporation.

We mount the cells 11 in a plastic base block 12, such block being provided with a group of parallel oblong recesses 13 equal in number to the number of columns to be "read" on the tape and spaced laterally apart by the distance separating the adjacent columns of apertures on the tape.

At each end of each of the recesses 13, we provide a transverse bore 14 through the block 12 to permit passage of the wire leads which serve as electrical terminals for the photocells 11.

A photocell 11 is mounted in each of the recesses 13 in the manner brought out in FIG. 4, with its terminal leads projecting through the block 12 and extending externally of the rear side thereof.

Above the block 12 we provide a thin slotted sheet 15, preferably having the same lateral and longitudinal dimensions as the block 12. Sheet 15 has a transverse slot 16 extending across and over the recesses 13, slot 16 being positioned so as to fall directly over the photosensitive areas 11*a* of the cells 11 when the sheet 15 is in registry with the block 12.

Disposed on top of the slotted sheet 15 in our reading head is a sheet 17, which may be made of plastic or other suitable material, sheet 17 being centrally apertured to receive a thin glass window 18. The extent of window 18 is sufficient to cover over the slot 16 with some margin.

Above the window-carrying sheet 17 we provide a cover plate 19, also designed to register with the base block 12. Cover plate 19 contains a plurality of small apertures 20, positioned for registration with the recesses 13, each aperture 20 being placed directly over one of the photosensitive areas 11*a*.

The base block 12 and the various overlying sheets just described are all provided with apertures to permit their being securely bolted together in registered position by means of mounting bolts 21, as shown in FIG. 2.

When the photocells 11 are placed in position within the recesses 13, the wire holes 14 are entirely filled with plastic cement, and the recesses 13 around the photocells 11 are filled with plastic cement to a depth sufficient to anchor the photocells firmly in place without, however, covering the sensitive areas 11*a*.

Similarly, before the sheets 15, 17, and 19 are assembled in position over base block 12, the upper edge of base block 12, the upper and lower edges of sheets 15 and 17, and the lower edges of cover plate 19 are coated with plastic cement, so as to form a securely moisture-proof assembly when the reading head has been assembled on its mounting block 22. Similarly, the glass window 18 may be securely cemented in position in sheet 17 by the use of plastic cement.

The assembled reading head, as just described, is mounted in hollow block 22 which may be made of brass or other suitable material. Block 22, in turn, is bolted to a base member 23 which holds suitable tape-guiding members and other parts of the apparatus presently to be described.

A recess in base member 23 is provided to receive a terminal block 24 carrying a plurality of suitable plugs or sockets 25 for making external electrical connection to the various photocells 11. Since this wiring is conventional in nature, it is not shown in detail in the drawing. It will be understood that the mounting block 22 is hollowed out to accommodate the wires **11*b* and to afford communication to the rear side of terminal block 24, so that circuit connections between the connectors 25 and the photocell leads 11*b*** can readily be made.

Our reading head assembly, as is shown in FIG. 3, is preferably mounted on the base 24 in a position whereat the tape 26 can readily be passed in front of the apertures 20. Immediately opposite the reading head proper we provide a light-source assembly 27, preferably an enclosed canlike element, containing an electric light source 28 and a lens 29, which functions to focus the light from source 28 into a collimated beam directed toward the apertures 20 of the reading head. The enclosure 27 is provided with a slot (not shown) directly in front of the apertures 20 to accommodate the light beam.

As may be seen from FIG. 3, the tape 26 passes between the light-source enclosure 27 and the tape-reading head. If desired, the facing surface of enclosure 27 may be slightly recessed to provide a guide passage for the tape 26, as indicated in FIG. 3, or other suitable tape-guiding means can be provided. Preferably, also a pair of friction brakes 30 should be mounted in the path of the tape both upstream and downstream of the reading head to insure smooth passage of the tape past the reading head at uniform speed. As shown in FIG. 3, the light-source enclosure 27 provides the bearing surface for the tape 26, thereby eliminating abrasion and wear of plate 19 (FIG. 1) and deposition of dust in the holes thereof. It will of course be understood that any suitable means (not shown) for advancing the tape past the reading head may be provided.

In operation of our reading head, the punched tape 26 moves past the apertures 20 at a uniform rate of speed. Wherever the tape is unpunched and hence opaque, it blocks off the light beam from access to the photocells 11. Whenever one of the holes in the tape 26 passes over one of the apertures 20, however, the light is permitted momentarily to pass through the tape and hence through aperture 20, window 18, and slot 16, thus impinging on the sensitive area **11*a* of one of the photocells 11. This results in generation of an electrical impulse across the terminals 11*b* of that photocell. Since the photocells are disposed in the block 12 in positions which respectively register with the various columns of apertures on the tape 26, the pattern of electrical impulses produced by the various photocells 11 corresponds exactly with the spatial distribution of punched holes longitudinally of the tape 26. Thus a pattern of electrical impulses is produced which contains the same coded information as that which is represented on the tape 26** by the punched holes therein.

The light from source 28 is effectively broken up by the cooperative action of the apertures 20, the slot 16, and the recesses 13 into a plurality of sharply defined beams, each of which is affected by a particular one of the columns of punched apertures in the tape 26 and each of which, in turn, actuates only a particular one of the photocells 11.

While we have in this specification described in considerable detail a typical embodiment of our invention, it should be understood that the description is intended to be merely illustrative. Many changes in matters of detail may be made in our apparatus by persons skilled in the art without departing from the spirit of our invention. It is therefore our desire that the scope of our invention be determined primarily by reference to the appended claims.

We claim:

1. For use with perforated tape containing coded information in the form of a plurality of parallel columns of spaced apertures extending longitudinally of said tape, photoelectric reading apparatus comprising, in combination, a block of insulating material having front and rear surfaces, said block being cut away to define on the front surface thereof a plurality of spaced recesses equal in number to the number of columns of apertures to be read on said tape, the width of each of said recesses approximating the width of said tape apertures, said recesses being laterally spaced apart by distances respectively corresponding to the lateral separation of said columns on said tape, a miniature photocell carried in each of said recesses, said block being cut away to define holes affording communication between said recesses and the rear surface of said block, connecting wires disposed in said holes and joined to said photocells for providing external circuit connections thereto, cover means overlying the front surface of said block, said cover means being constructed to define a plurality of separate light-conductive paths between the front surface of said cover means and the interior of each of said recesses, the entrance to each of said paths on the front surface of said cover means being disposed directly over the recess with which such path communicates, said cover means comprising also a transparent window intercepting said light paths and affording a seal against passage of moisture and other foreign matter therethrough, a moisture-proof sealing means such as plastic cement sealing off the adjoined edges of said cover means and said block and filling said wire-carrying holes to provide a complete seal against access of moisture and other foreign matter into said recesses, a light source mounted opposite the front surface of said cover means, and means for passing said tape between said light source and said cover means whereby light passing through the apertures in said respective columns on said tape may enter said respective light paths and impinge upon said respective photocells.

2. The apparatus of claim 1 wherein said sealing means also partially fills said recesses, sealing said photocells in position therein.

3. The apparatus of claim 1 wherein said cover means comprises three laminated sheets, one of which has said window disposed therein, another of which carries a transverse slot disposed for registration with all of said recesses, and the third one of which carries a plurality of spaced apertures equal in number to said recesses and positioned to directly overlie the same, said apertures, said window, and said slot collectively defining said plurality of light paths.

4. For use with perforated tape containing coded information in the form of a plurality of parallel columns of spaced apertures extending longitudinally of said tape, photoelectric reading apparatus comprising, in combination, a block of insulating material having front and rear surfaces, said block having a plurality of spaced recesses in the front surface thereof and equal in number to the number of columns of apertures to be read on said tape, the width of each of said recesses approximating the width of said tape apertures, said recesses being laterally spaced apart by distances respectively corresponding to the lateral separation of said columns on said tape, a miniature photocell carried in each of said recesses, said block having holes therein affording communication between said recesses and the rear surface of said block, connecting leads disposed in said holes and joined to said photocells for providing external circuit connections thereto, cover means overlying the front surface of said block, said cover means being constructed to define a plurality of separate light-conductive paths between the front surface of said cover means and the interior of each of said recesses, the entrance to each of said paths on the front surface of said cover means being disposed directly over the recess with which such path communicates, said cover means comprising also a transparent window intercepting said light paths and affording a seal against passage of moisture and other foreign matter therethrough, moisture-proof sealing means sealing off the adjoined edges of said cover means and said block and filling said lead-carrying holes to provide a complete seal against access of moisture and other foreign matter into said recesses, a light source mounted opposite the front surface of said cover means, and means for passing said tape between said light source and said cover means whereby light passing through the apertures in said respective columns on said tape may enter said respective light paths and impinge upon said respective photocells.

References Cited in the file of this patent

UNITED STATES PATENTS 2,320,338 Bryce ---------------- June 1, 1943